US011859129B2

(12) United States Patent
Uddenburg et al.

(10) Patent No.: US 11,859,129 B2
(45) Date of Patent: Jan. 2, 2024

(54) METHODS OF FORMING A PERMEABLE PROPPANT PACK IN A GEOTHERMAL FORMATION

(71) Applicant: AltaRock Energy, Inc., Seattle, WA (US)

(72) Inventors: Matt Uddenburg, Seattle, WA (US); Geoff Garrison, Seattle, WA (US); Susan Petty, Seattle, WA (US)

(73) Assignee: ALTAROCK ENERGY INC., Seattle, WA (US)

( * ) Notice: Subject to any disclaimer, the term of this patent is extended or adjusted under 35 U.S.C. 154(b) by 0 days.

(21) Appl. No.: 18/076,692

(22) Filed: Dec. 7, 2022

(65) Prior Publication Data
US 2023/0174848 A1 Jun. 8, 2023

Related U.S. Application Data

(60) Provisional application No. 63/287,292, filed on Dec. 8, 2021.

(51) Int. Cl.
*C09K 8/80* (2006.01)
*E21B 43/267* (2006.01)

(52) U.S. Cl.
CPC ............ *C09K 8/805* (2013.01); *E21B 43/267* (2013.01)

(58) Field of Classification Search
CPC ......... C09K 8/805; C09K 8/80; E21B 43/267; E21B 43/04; E21B 43/26
See application file for complete search history.

(56) References Cited

U.S. PATENT DOCUMENTS

| | | |
|---|---|---|
| 3,026,938 A | 3/1962 | Huitt et al. |
| 3,256,236 A | 6/1966 | Herman et al. |
| 3,664,420 A | 5/1972 | Graham et al. |
| 7,666,469 B2 | 2/2010 | Weintritt et al. |

(Continued)

FOREIGN PATENT DOCUMENTS

| | | | |
|---|---|---|---|
| AU | 2013390825 A1 * | 10/2015 | ............. E21B 43/26 |
| WO | WO 2009/088315 A1 | 7/2009 | |
| WO | WO 2016/115038 A1 | 7/2016 | |

OTHER PUBLICATIONS

Bomgardner, Melody M., A workhorse for oil and gas extraction sees material advances amid growing, Article, Sep. 5, 2011, vol. 89, Issue 36, Chemical and Engineering News, Washington DC.

(Continued)

*Primary Examiner* — Zakiya W Bates
(74) *Attorney, Agent, or Firm* — Thorpe North & Western, LLP.

(57) ABSTRACT

A method of forming a permeable proppant pack in a geothermal formation can include injecting a fracturing fluid into a fracture of a geothermal formation having a formation temperature greater than about 275° C. The fracturing fluid can include proppants having a core of a solid material that is thermally stable at the formation temperature. The core can be at least partially coated with a resin coating that includes a polymer having a decomposition temperature below the formation temperature and a melting temperature below the decomposition temperature. The resin coating can be decomposed by the heat from the geothermal formation and the core of the proppants can remain in the fracture after the resin coating has decomposed.

24 Claims, 4 Drawing Sheets

(56) References Cited

U.S. PATENT DOCUMENTS

| | | | |
|---|---|---|---|
| 7,775,278 | B2 | 8/2010 | Willberg et al. |
| 8,231,947 | B2 | 7/2012 | Viadya et al. |
| 8,281,857 | B2 | 10/2012 | Willberg et al. |
| 8,353,344 | B2 | 1/2013 | Carlson et al. |
| 8,596,361 | B2 | 12/2013 | Willberg et al. |
| 8,603,578 | B2 | 12/2013 | Smith et al. |
| 9,090,810 | B2 | 7/2015 | Bour et al. |
| 9,273,243 | B2 | 3/2016 | Chaterjee et al. |
| 9,376,885 | B2 | 6/2016 | Bour et al. |
| 10,005,953 | B2 | 6/2018 | Dahi Taleghani et al. |
| 10,030,493 | B2 | 7/2018 | Nguyen et al. |
| 10,851,283 | B2 | 12/2020 | Potapenko et al. |
| 2016/0137908 | A1 | 5/2016 | Alwattari et al. |
| 2016/0145488 | A1* | 5/2016 | Aines ............... E21B 43/267 507/221 |
| 2016/0347985 | A1 | 12/2016 | Li et al. |
| 2019/0048254 | A1* | 2/2019 | Cannan ............ G01R 33/1276 |
| 2020/0240234 | A1* | 7/2020 | Palisch ............... E21B 43/04 |
| 2020/0306710 | A1* | 10/2020 | Cho ....................... B01J 2/06 |

OTHER PUBLICATIONS

Afrooz, Iman Eslami et al., A Modified Model for Kinetic Analysis of Petroleum Coke, Journal, Sep. 2019, vol. 2019, Article ID2034983, 8 pages, Hindawi, London, England.

Liang, Feng et al., A comprehensive review on proppant technologies, Journal, Nov. 2015, pp. 26-39, Kei Publishing, Washington DC.

Jones, Clay G et al., Proppant Behavior Under Simulated Geothermal Reservoir Conditions, Feb. 2014, 6 pages, California.

\* cited by examiner

100 ⤳

```
┌─────────────────────────────────────────────┐
│ injecting a fracturing fluid into a fracture of a geothermal │
│ formation, where the fracturing fluid comprises proppants │
│ having a core of a solid material that is thermally stable at │
│ the formation temperature, where the core is at least │
│ partially coated with a resin coating, and where the resin │      ⤳ 210
│ coating comprises a polymer having a decomposition │
│ temperature below the formation temperature and a │
│ melting temperature below the decomposition temperature │
└─────────────────────────────────────────────┘
                        │
                        ▼
┌─────────────────────────────────────────────┐
│ allowing the resin coating to be decomposed by heat from │
│ the geothermal formation, where the core of the proppants │      ⤳ 220
│ remains in the fracture after the resin coating has │
│ decomposed │
└─────────────────────────────────────────────┘
```

FIG. 1

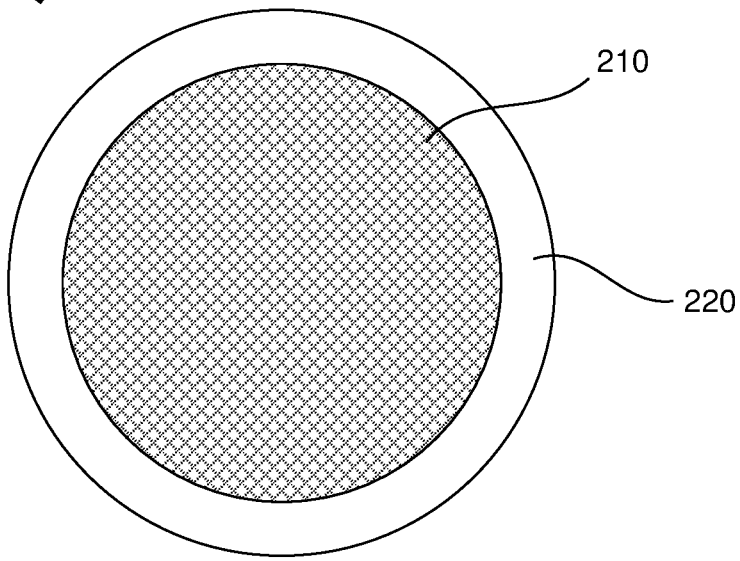

FIG. 2

METHODS OF FORMING A PERMEABLE PROPPANT PACK IN A GEOTHERMAL FORMATION

RELATED APPLICATIONS

This application claims priority to U.S. Provisional Patent Application No. 63/287,292, filed Dec. 8, 2021 which is incorporated herein by reference.

BACKGROUND

Geothermal wells can be used to extract heat from geothermal formations for production of electricity. High-temperature fluid can be produced from the geothermal wells. Heat from the high-temperature fluid can be converted to electricity, for example by passing the high-temperature fluid through a steam turbine generator either directly (e.g., flash steam cycles and dry steam cycles) or via a secondary heat secondary heat exchanger (e.g. binary cycles). In some geothermal production systems, fluid can be injected into the geothermal formation through a geothermal well, the fluid can be heated by the geothermal formation, and then the fluid can be produced from the same well. In other systems, separate injection and production wells can be used. In both types of systems, high permeability of the geothermal formation can increase fluid flow and heat transfer. The geothermal formation can include fractures that allow fluid to flow into and through the formation. Higher permeability in the geothermal formation can allow fluid to flow through the formation at a greater rate, which in turn can provide more electricity generation. Although geothermal formations exhibit natural fractures, these fractures and new fractures can be enhanced and created via hydraulic fracturing and hydroshearing processes.

In the oil and gas industry, proppants have been widely used in combination with hydraulic fracturing to help maintain fracture permeability after injection of a fracturing fluid. In many cases, a fracturing fluid is injected at high pressure to stimulate and open existing fractures in the rock, or to form new fractures, or both. Proppants are often small particles of solid material that are introduced into the fractures when the fractures are opened by the high-pressure fracturing fluid. When the pressure is reduced, the proppants remain in fractures and prevent the fractures from fully closing. Although proppants are often used in oil and gas wells, geothermal environments (e.g. SHR) present unique challenges in terms of high temperatures and pressures which are often not suitable for conventional proppants used in oil and gas wells.

SUMMARY

The present method involves the use of proppants to form a permeable proppant pack in a geothermal formation. Hydraulic fracturing methods can be used to open fractures in high-temperature rock and solid proppant particles can be introduced into the open fractures. The proppant particles can remain in the fractures to maintain permeability of the fractured rock. In some examples, a method of forming a permeable proppant pack in a geothermal formation can include injecting a fracturing fluid into a fracture of a geothermal formation having a formation temperature greater than about 275° C. The fracturing fluid can include proppants having a core of a solid material that is thermally stable at the formation temperature, and the core can be at least partially coated with a resin coating. The resin coating can include a polymer having a decomposition temperature below the formation temperature and a melting temperature below the decomposition temperature. The method can also include allowing the resin coating to be decomposed by heat from the geothermal formation. The core of the proppants can remain in the fracture after the resin coating has decomposed.

In another example, a high-temperature proppant can include a core comprising porous calcined petroleum coke having a mineral solubility modifying agent held within pores of the porous calcined petroleum coke. The mineral solubility modifying agent either promotes precipitation of minerals in a fracture of a high-temperature formation or promotes dissolution of minerals in a fracture in a high-temperature formation. A resin coating can at least partially coat the core. The resin coating can include a polymer having a decomposition temperature from about 250° C. to about 400° C. and a melting temperature below the decomposition temperature.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1 is a flowchart illustrating an example method of forming a permeable proppant pack in a geothermal formation, in accordance with the present disclosure.

FIG. 2 is a cross-sectional view of an example high temperature proppant in accordance with the present disclosure.

Figure 3:
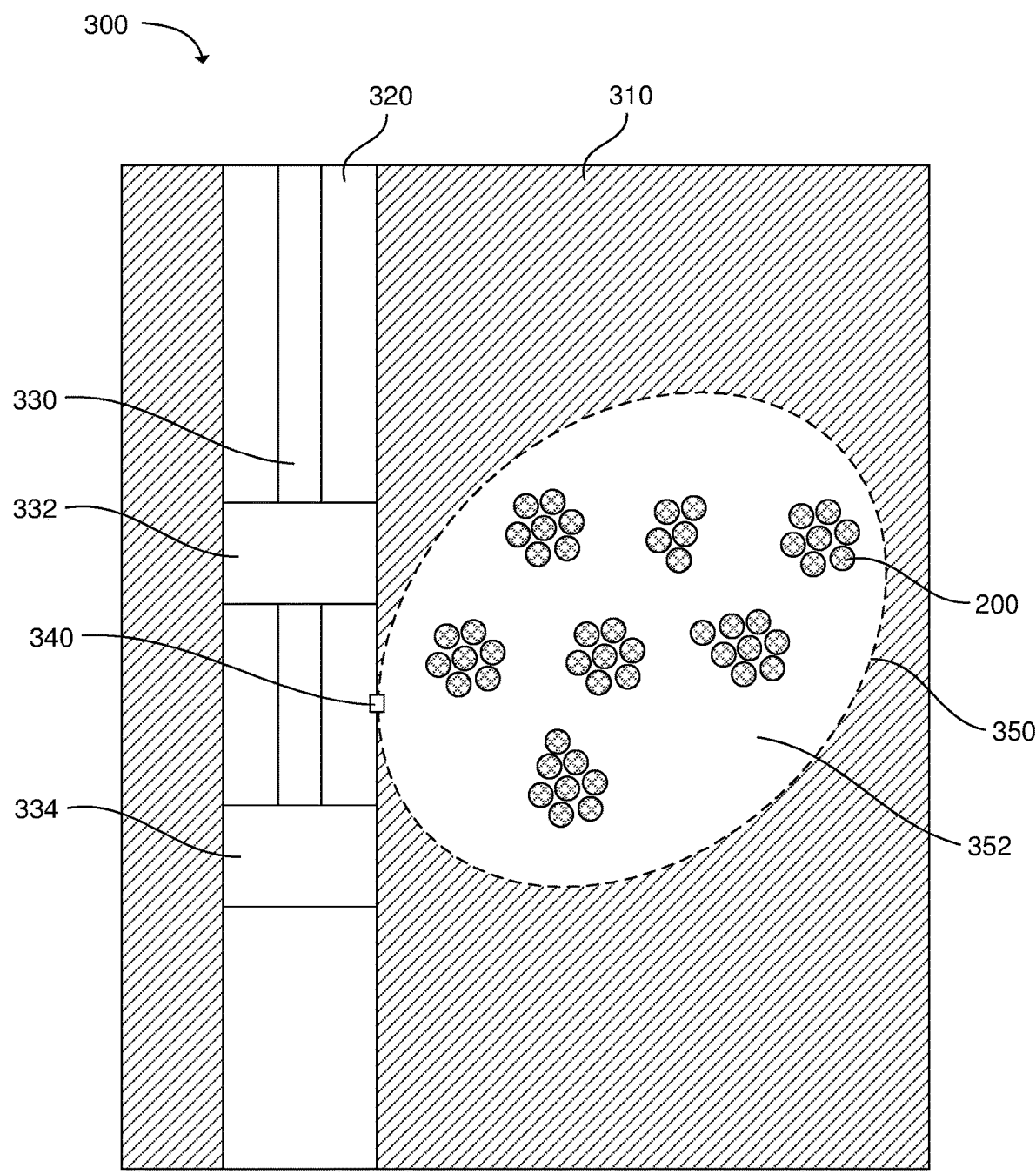
FIG. 3 is a schematic view of an example system for forming a permeable proppant pack in a geothermal formation in accordance with the present disclosure.

These drawings are provided to illustrate various aspects of the invention and are not intended to be limiting of the scope in terms of dimensions, materials, configurations, arrangements, or proportions unless otherwise limited by the claims.

DETAILED DESCRIPTION

While these exemplary embodiments are described in sufficient detail to enable those skilled in the art to practice the invention, other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

In describing and claiming the present invention, the following terminology will be used.

The singular forms "a," "an," and "the" include plural referents unless the context clearly dictates otherwise. Thus, for example, reference to "a particle" includes reference to one or more of such materials and reference to "injecting" refers to one or more such steps.

As used herein with respect to an identified property or circumstance, "substantially" refers to a degree of deviation that is sufficiently small enough to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all the above-recited values and ranges. Further, such an interpretation should apply regardless of the breadth of the range, or the characteristic being described.

Means-plus-function or step-plus-function limitations will only be employed where for a specific claim limitation all the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

The present disclosure describes methods of forming a permeable proppant pack in a geothermal formation and particular proppants that can be used in geothermal formations. As mentioned above, proppants have often been used in the oil and gas industry to maintain permeability of fractures. However, such proppants have not been widely used in geothermal wells for a few reasons. First, many previous proppants have been made from materials that dissolve or degrade in water at high temperatures found in geothermal formations. Superhot rock (SHR) in geothermal formations can be at very high temperatures such as greater than 350° C. or greater than 400° C. Sand is a common proppant material, but sand begins dissolving at temperatures greater than about 225° C. Sintered bauxite begins degrading at temperatures above about 275° C. Therefore, these materials can be less effective as proppants in even moderate-temperature geothermal wells down to about 275° C.

Dissolved minerals in geothermal fluids can also sometimes form deposits in fractures in the geothermal rock. The dissolved minerals may originate from dissolving proppants or from the geothermal rock itself. In some cases, mineral deposits can build up in fractures over time, which decreases the permeability of the fractures. Thus, the mineral deposition process can reduce the effectiveness of proppants used in the fractures.

Additionally, many conventional proppants are made from materials that are more than twice the density of water. As a result, it can be difficult to make dense proppants flow into fractures that propagate horizontally or upward since gravity pulls the proppants downward. In the oil and gas industry, viscosifiers are sometimes used to increase the viscosity of fracturing fluid. The higher-viscosity fracturing fluid can help carry proppants into fractures. However, the viscosifiers that are currently available cannot be used at the high temperatures of geothermal formations and particularly in SHR. Thus, it is difficult to effectively introduce dense proppants into fractures in geothermal formations.

The present disclosure describes proppants and methods of using the proppants in geothermal formations. These methods can mitigate the difficulties that have previously been encountered when using proppants in geothermal wells. Proppants can be prepared with a core of a solid material that is thermally stable at the temperature of the geothermal formation. In certain examples, the core can be made of petroleum coke, which is a carbon-rich solid produced in large quantities as a byproduct of oil-refining processes. Petroleum coke can be thermally stable and can withstand temperatures of 500° C. or higher. Petroleum coke can also be chemically resistant, non-soluble, and can have sufficient mechanical strength to prop open fractures without crushing. Petroleum coke also has a low density in the range of about 1.5 g/cm$^3$ to about 2.5 g/cm$^3$. If petroleum coke is calcined, some hydrocarbon material and any remaining moisture can be removed to leave behind pores in the calcined petroleum coke. These pores can further reduce the density. For example, a reduced density of 2.04 to 2.07 g/cm$^3$ can be achieved.

The proppant core can be coated with a resin coating. The resin coating can include a polymer having a decomposition temperature below the temperature of the geothermal formation and a melting temperature below the decomposition temperature. The resin coating can be useful in multiple ways. First, the resin coating can form a seal over open pores in the core. Air can be trapped in the pores in the core beneath the resin coating, which can make the proppants less dense. As mentioned above, it can be useful to use proppants with low density so that the proppants can flow into fractures together with a fracturing fluid without settling out too quickly under the force of gravity. The resin coating itself can also have a low density, such as from about 1 g/cm$^3$ to about 1.5 g/cm³. In this manner the density and buoyancy of the proppant can be varied. Additionally, the resin coating can undergo a melting and degradation process after the proppants are injected into a geothermal well.

The proppants can be injected with a fracturing fluid at a temperature below the melting temperature of the resin coating. The proppants can flow into fractures in the geothermal rock. Over time the temperature of the rock can rise back toward the original temperature of the rock before the fracturing fluid was injected. As the temperature rises, the resin coating can begin to melt and become sticky. Proppant particles can stick together to form agglomerations of many proppant particles in close contact one with another. The temperature can then rise to the decomposition temperature of the resin coating, at which temperature the resin begins to degrade. Melting of the resin coating can occur over a time sufficient to allow proppants to be oriented in the initial fracturing stages.

For example, the resin can chemically react to form other compounds and/or break down into smaller molecules. Eventually, the resin coating can completely degrade into products that dissolve or are washed away and the proppant cores can be left behind in the fracture. Since the proppants agglomerated while the resin coating was sticky, the remaining proppant cores can be arranged in densely packed groups with large open spaces in the fractures between the dense groups of proppant cores. The open spaces can provide high permeability for fluids to flow through the fractures. Further, these proppant cores can generally be free of polymer coating after degradation of the resin.

The methods described herein can also include additional ways to modify and enhance the proppants, such as by adding low-density materials to the resin coating, embedding a mineral solubility modifying agent in the proppant cores, injecting the proppants together with a fully thermally degradable material to form islands of proppants separated by open spaces left behind by the thermally-degradable material, and the like. These and other features are explained in more detail below.

One example method 100 of forming a permeable proppant pack in a geothermal formation is shown in FIG. 1. This method includes injecting a fracturing fluid into a fracture of a geothermal formation having a formation temperature greater than about 230° C. and in some cases greater than 275° C. In some cases, the formation can be an SHR formation. Similarly, in some cases the formation temperature can be greater than 400° C. The fracturing fluid comprises proppants having a core of a solid material that is thermally stable at the formation temperature. The core is at least partially coated with a resin coating which comprises a polymer having a decomposition temperature below the formation temperature and a melting temperature below the decomposition temperature 110. The resin coating can be allowed to be decomposed by heat from the geothermal formation, wherein the core of the proppants remains in the fracture after the resin coating has decomposed 120.

In one alternative, the proppant can have an exterior surface which is roughened so as to allow control over friction with formation walls. For example, increasing surface roughness can increase probabilities that proppants will remain in place at higher flow rates. As a general rule, surface roughness can be varied from N8 to N12 depending on formation conditions, rock type, and other factors.

FIG. 2 shows a close-up cross-sectional view of an example proppant 200. The proppant is a particle including a core 210 made of a solid material that is thermally stable at geothermal temperatures, such as greater than about 275° C. The core is coated with a resin coating 220. The resin coating includes a polymer having a decomposition temperature below the temperature of the geothermal formation in which the proppant is to be used. This allows the resin coating to degrade and fall away over time when the proppants are heated up to the temperature of the formation. The polymer also has a melting temperature that is below the decomposition temperature. This allows the proppants to become tacky when the resin coating begins to melt. As a result, multiple neighboring proppant particles can adhere together to form agglomerations of proppants.

The proppant shown in FIG. 2 has a spherical shape. In other examples, other shapes can be used such as irregular shapes, fiber shapes, rod shapes, block shapes, and others. Combinations of multiple different shapes can also be used. However, in certain examples the proppants can be spherical or nearly spherical. Nearly spherical proppants can have a low aspect ratio, defined as the longest dimension divided by the shortest dimension, from about 1 to about 1.5, or from about 1 to about 1.2, or from about 1 to about 1.1.

The size of the proppants can vary, but in some examples the proppants can have an average total diameter from about 1 μm to about 4 mm, and in some cases 0.5 mm to 5 mm. The average total diameter can be a number average of the diameter of proppant particles, including the core and the resin coating together. In further examples, the proppants can have a relatively uniform size. For example, the proppants can have a narrow size distribution in which at least 90% of the proppant particles are within a range from about 75% of the average diameter to about 125% of the average diameter, or from about 80% of the average diameter to about 120% of the average diameter, or from about 90% of the average diameter to about 110% of the average diameter. In one alternative, proppants can have a relatively broad size distribution to accommodate variations in fracture apertures and type. In such cases, proppants can have less than 90% which are within 25% of average diameters.

The core of the proppant can be made from a solid material that is thermally stable at the temperature of the geothermal formation in which the proppant is to be used. As used herein, "thermally stable" means that the material can be heated at the temperature of the geothermal formation without chemically decomposing, reacting, dissolving, melting, or otherwise degrading in a way that would cause the proppant core to be removed from a fracture in the geothermal formation. The thermally stable material can be stable for at least a time period of 14 days, or one month, or three months, or six months, or one year, or longer, and in one example at least 30 days. Thus, the proppant core can remain in a fracture in the geothermal formation for an extended period of time while being exposed to the temperature of the surrounding geothermal formation, and the proppant core does not degrade over the extended period of time such that the proppant core can keep the fracture open. In certain examples, the proppant core can be thermally stable up to a temperature greater than 275° C., or greater than 300° C., or greater than 350° C., or greater than 400° C., or greater than 500° C. In certain examples, the maximum stable temperature of the proppant core can be from about 275° C. to about 500° C., or from about 300° C. to about 475° C., or from about 275° C. to about 350° C.

The solid material of the proppant core can also have a sufficient mechanical strength to prop open fractures in geothermal formations. Some non-limiting examples of proppant core materials include petroleum coke, calcined petroleum coke, coal coke, ceramic, metal oxides, metal hydroxides, graphite, high temperature silica, high temperature glass (e.g. VYCOR), other high temperature carbonaceous materials, or combinations thereof. In this context, "high temperature" would indicate thermal stability at geothermal formation temperatures for at least a time of operation of the geothermal recovery process. If the proppant core is made from petroleum coke, in some examples the petroleum coke can be raw petroleum coke or calcined petroleum coke. Other specific examples of suitable core materials can include, not are not limited to, kaolin, buckyballs (C60), carbon nanotubes, and the like.

The proppant core can also be used as a carrier to carry a mineral solubility modifying agent into a geothermal fracture. The mineral solubility modifying agent can be a compound that either promotes precipitation of minerals in the fracture or promotes dissolution of minerals in the fracture. In some examples, the mineral solubility modifying agent can promote precipitation of minerals in the fracture, or in other words, the agent can cause an increased amount of minerals to precipitate and deposit in the fracture. The mineral solubility modifying agent can be on the proppant cores or held within pores in the proppant cores. Therefore, the increased mineral deposition can occur around the proppant cores in the fracture. In certain examples, minerals can be deposited on and around the proppant cores, and these minerals can act as a cement to hold the proppant cores in place in the fracture. The minerals can also add strength to the proppant pack. As mentioned above, the proppant cores can be agglomerated together due to the stickiness of the resin coating when the resin is near its melting temperature. Thus, in some examples, many proppant cores can be agglomerated near each other, and minerals can be deposited in spaces between the proppant cores and between the cores and the surround geothermal rock. Such a combination of agglomerated proppant cores and deposited minerals can form a very strong proppant pack that can remain in place in the fracture.

In other examples, the mineral solubility modifying agent can be a compound that increases solubility of minerals in the fracture. Such compounds can cause increased dissolution of minerals in the fracture. The increased dissolution may counteract mineral deposition that would otherwise occur. The increased dissolution may also cause some minerals in the surrounding geothermal rock to be dissolved and removed, thereby increasing the permeability of the rock.

Examples of mineral solubility modifying agents can include anhydrous calcium sulfate, NaOH, HCl, $H_2SO_4$ (and others that alter pH), EDDHA, EDTA (chelating agents), and the like. In certain examples, when anhydrous calcium sulfate is used as the mineral solubility modifying agent, the proppants can be injected together with a fracturing fluid that includes sodium carbonate. The anhydrous calcium sulfate can react with the sodium carbonate to form calcium carbonate, which precipitates and deposits around the proppant cores in the fracture. The deposited calcium carbonate can act as a cement to hold the proppant cores in place and to strengthen the proppant pack. In the chemical reaction of calcium sulfate with sodium carbonate, sodium sulfate can also be formed. The sodium sulfate is water soluble and will simply be carried away by water flowing in the fracture. Since the proppant cores are initially coated by a resin coating, the anhydrous calcium sulfate in the cores does not react with the sodium carbonate in the fracturing fluid until after the resin coating is removed by degradation at high temperature.

In another example, the coating can include a mineral solubility modifying agent which acts as a precursor to formation of a carbonate mineral phase. Such mineral solubility modifying agents can include urea, dimethyl carbonate, or the like. Upon delivery and placement of the proppants within the fractures, a second fluid containing a solution of a divalent cation salt can be injected and flush through the fractures to contact the placed proppants. Non-limiting examples of suitable divalent cation salts can include calcium chloride, magnesium chloride, calcium bromide, calcium iodide, magnesium bromide, magnesium iodide, and the like. Reaction between the mineral solubility modifying agent and the divalent cation salt forms a carbonate mineral phase which deposits on the proppants and surrounding formation. As one example, the mineral solubility modifying agent can be deposited within proppant core porous structure by solution deposition or mixed directly with the resin. Although concentration can vary, the mineral solubility modifying agent can be a minor component of the coating and is typically less than about 10% by weight of the coating, and often less than 5% by weight.

Some proppant core materials can be porous. In such examples, a mineral solubility modifying agent can be held within pores of the proppant core. Calcined petroleum coke is one example of a porous proppant core material. Therefore, in certain examples the proppant core can include porous calcined petroleum coke with a mineral solubility modifying agent held within pores of the calcined petroleum coke. In other examples, the proppant core can be made of porous calcined petroleum coke without any mineral solubility modifying agent in the pores. In some examples, the proppant core can consist essentially of porous calcined petroleum coke and an optional mineral solubility modifying agent, i.e., the proppant core can be substantially devoid of any other materials besides the porous calcined petroleum coke and optional mineral solubility modifying agent. In a particular example, the proppant core can consist essentially of porous calcined petroleum coke with anhydrous calcium sulfate held within pores of the porous calcined petroleum coke.

The amount of mineral solubility modifying agent included in the proppant can be less than the amount of the thermally stable solid core material such as petroleum coke. In various examples, the proppant core can include from about 75 wt % to 100 wt % of a solid, thermally stable material and up to about 25 wt % of a mineral solubility modifying agent if such agent is included. In certain examples, the proppant core can include the thermally stable solid material in an amount from about 80 wt % to about 99 wt % and the mineral solubility modifying agent in an amount from about 1 wt % to about 20 wt %. In other examples, the proppant core can include the thermally stable solid material in an amount from about 90 wt % to about 99 wt % and the mineral solubility modifying agent in an amount from about 1 wt % to about 10 wt %.

The thermally stable solid material of the proppant core can be porous in some examples. As explained above, the pores can be used to carry a mineral solubility modifying agent in some examples. The porosity can also be useful to reduce the overall density of the proppants. Open pores can be filled with air. The resin coating that is added to the surface of the proppant core can seal off the pores and trap air inside the proppant. Thus, the overall density of the proppant can be lower when the porosity of the proppant core is higher. Adding a mineral solubility modifying agent to the proppant core can be useful for the reasons explained above. However, the mineral solubility modifying agent can also occupy some of the pore space and thus increase the density of the proppant. Therefore, the amount of mineral solubility modifying agent that is added can be balanced with the desired amount of open pore space for maintaining a low proppant density. In some examples, the mineral solubility modifying agent can be included in an amount that fills from about 1% to about 99% of the pore volume in the proppant core. In other examples, the mineral solubility modifying agent can be included in an amount that fills from about 5% to about 75%, or from about 5% to about 50%, or from about 5% to about 25% of the pore volume in the proppant core.

The resin coating on the proppant core can include a polymer that has a decomposition temperature below the temperature of the geothermal formation in which the proppant is to be used. As used herein, the "decomposition temperature" refers to a temperature at which the polymer undergoes thermal degradation, which includes chemical changes to the polymer. In some examples, the polymer can break down into smaller molecules. The polymer can then physically break down into smaller pieces that can be washed away or dissolved in water or other fluid flowing through the geothermal fracture. Thermal decomposition may occur immediately at the decomposition temperature or over a period of time, such as over a period of 1 minute to 60 minutes, or 60 minutes to 6 hours, or 6 hours to one day, or one day to one week, for example. In various examples, the polymer in the resin coating can have a decomposition temperature from about 150° C. to about 500° C., or from about 200° C. to about 400° C., or from about 300° C. to about 375° C.

The polymer can also have a melting temperature that is below the decomposition temperature in some examples. This can allow the polymer to begin to melt as the proppants heat up so that the proppants become sticky and stick together. In some examples, the melting temperature can be from about 120° C. to about 400° C. or from about 200° C. to about 350° C. or from about 250° C. to about 300° C. In other examples, the polymer can have a glass transition temperature ($T_g$) that is below the decomposition temperature. Heating the proppants above the glass transition temperature can also cause the resin coating to become sticky. In some examples, the glass transition temperature can be from about 120° C. to about 400° C., or from about 200° C. to about 350° C. or from about 250° C. to about 300° C. It is also noted that degradation time for the coating will be a function of reservoir temperature, coating thickness, polymer type, and the like. However, such variables can be considered during choice and design of the proppant coating to achieve a desired degradation time, e.g. generally 3 hours to about 14 days.

Some non-limiting examples of polymers that can be included in the resin coating include polyethylene terephthalate, polybutylene terephthalate, polycarbonate, epoxy, acrylonitrile butadiene styrene, and combinations thereof. In some examples, the resin coating can include a single polymer, while in other examples the resin coating can include a mixture of multiple polymers.

In addition to the polymer, in some examples the resin coating can include a particulate material distributed within the coating. The particulate material can be a material such as perlite, expanded graphite, silica (e.g. unmodified silica, fluorine-modified silica nanoparticles, etc.), mineral solubility modifying agent, tracer material, or combinations thereof. The particulate material can have an average particle size from about 1 micron to about 1,000 microns, or from about 1 micron to about 500 microns, or from about 1 micron to about 200 microns, or from about 1 micron to about 100 microns, or can be nanoparticles (e.g. less than about 1 micron), in some examples. In various examples, the resin coating can include the particulate material in an amount from about 1 wt % to about 75 wt % with respect to the total weight of the resin coating, or from about 1 wt % to about 50 wt %, or from about 1 wt % to about 25 wt %. The particulate material can have a lower density than the polymer in the resin coating. Therefore, adding the particulate material can decrease the density of the proppants in some cases. In some examples, the proppants can have an overall density, including the core and resin coating, from about 1 g/cm³ to about 2.5 g/cm³, or from about 1 g/cm³ to about 2 g/cm³, or from about 1 g/cm³ to about 1.5 g/cm³, or from about 1.5 g/cm³ to about 2 g/cm³.

The resin coating can fully enclose the proppant core in some examples. However, in other examples the resin coating may partially coat the proppant core. However, it can be useful to have a resin coating that fully coats the proppant core so that the resin coating can trap air in pores of the proppant and/or prevent a mineral solubility modifying agent from being released from the proppant core until after degradation of the coating within the formation at a desired fracture location. The thickness of the resin coating can vary, but in some examples the thickness can be from about 0.5 mm to about 2 mm. In one aspect, the thickness of the resin coating can be 1% to 20% of a total particle diameter, and in some cases 5% to 15%.

These proppants can be injected into a fracture in a geothermal formation. As explained above, the geothermal formation can have a formation temperature that is above the decomposition temperature of the polymer in the resin coating. In various examples, the formation temperature can be from about 275° C. to about 600° C., or from about 300° C. to about 500° C., or from about 350° C. to about 500° C. FIG. 3 shows an example system 300 that can be used to inject the proppants 200 with fracture fluid into fractures in a geothermal formation 310. A wellbore 320 is drilled into the geothermal formation and a frack string 330 is lowered into the wellbore. In this example, the frack string includes packers 332, 334 to isolate a portion of the wellbore. However, in other examples, the proppants can be used with other methods such as, but not limited to, sliding sleeves, plug and perforation methods, and the like. A fracturing fluid is injected into the space between the packers at high pressure, and the fracturing fluid flows into the geothermal formation through a perforation 340 in the wall of the wellbore, although more than one perforation can also be used. A dashed outline shows the fracture region 350 where the fracturing fluid, including the proppants, penetrates into the formation. Note that the size of the proppants 200 is exaggerated for this description and that the fracture region 350 is an idealized schematic. In practice, the fracture region may be less defined and irregular, including gradients in fracture pressure and fracture propagation throughout with irregular fractures extending and branching along rock planes and varied formation features.

In addition to the proppants, the fracturing fluid 352 can include water and other ingredients. Additional ingredients can include additives such as biocides, acids, corrosion inhibitors, scale inhibitors, pH adjusting agents, surfactants, and others. In certain examples, the fracturing fluid can be devoid of viscosifiers. The low density of the proppants described herein can allow the proppants to be carried into fractures by the fracturing fluid even without viscosifiers. In some examples, the fracturing fluid can include water in an amount from about 90 wt % to about 99.9 wt %. The proppant particles can be included in the fracturing fluid in an amount from about 0.1 wt % to about 5 wt % in some examples, with respect to the total weight of the fracturing fluid.

The fracturing fluid can be injected into an isolated portion of a geothermal well. As such, in some examples the method can include isolating a portion of the geothermal well before injecting the fracturing fluid into the geothermal formation. In certain examples, the portion of the geothermal well can be isolated mechanically using a frack string such as the one illustrated in FIG. 3. The frack string can include packers to seal off a portion of the well from the remainder of the well while the fracturing fluid is being injected. Other methods can also be used to isolate a portion of the geothermal well, such as placing casings in the well in other portions where the fracturing fluid is not to be injected.

Figure 4A:
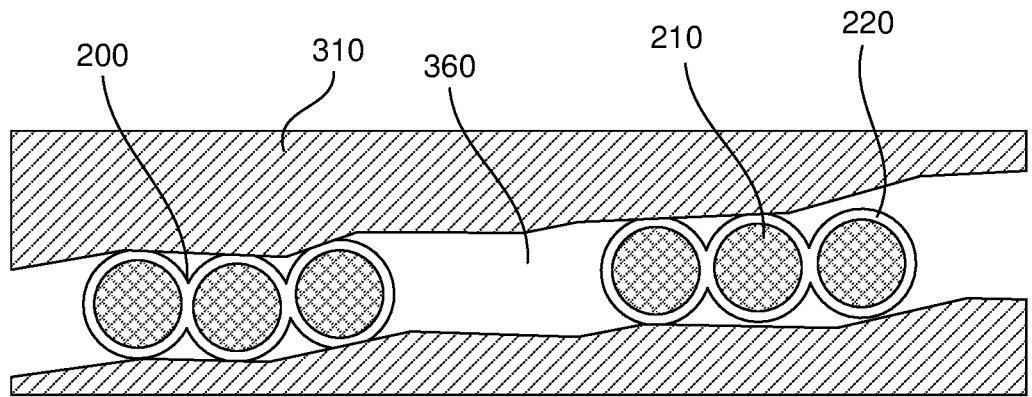
FIGS. 4A-4B are cross-sectional views of an example fracture having proppants therein in accordance with an example of the present disclosure.

FIG. 4A shows a close-up view of a fracture 360 in a geothermal formation 310 with multiple proppants 200 in the fracture. The proppants include cores 210 and resin coatings 220 as explained above. In this figure, the resin coatings have begun to melt together so that the proppant particles have agglomerated into groups. The resin coatings can stick together in this way when heat from the geothermal formation cause the temperature of the proppants to rise sufficiently after the proppants have been injected into the fracture.

Figure 4B:
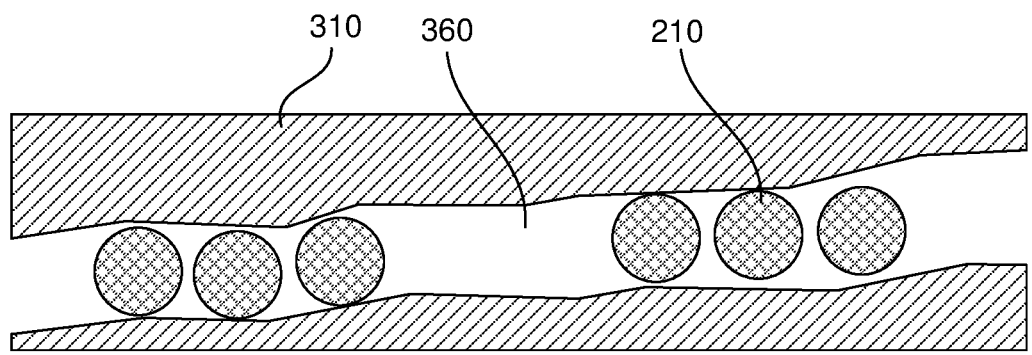

FIG. 4B shows the fracture 360 after the temperature has risen further and/or sufficient time has elapsed. The temperature has risen above the decomposition temperature of the resin coating of the proppants, leaving behind the proppant cores 210 in the fracture. As explained above, the proppant cores are made from a thermally stable material that is also strong enough the prop open the fracture. Therefore, the proppants cores can remain in the fracture and keep the fracture open so that the geothermal formation has increased permeability.

It can also be useful to use the proppants described herein together with a thermally degradable material. In particular, a thermally degradable material can be injected into fractures to occupy some of the volume inside the fractures, and then the thermally degradable material can be completely removed by thermal decomposition to leave behind open spaces where the thermally degradable material previously was present. In some examples, a thermally degradable material can be injected into the fractures together with the proppants in such a way that the proppants form discrete islands separated by thermally degradable material. After the formation reheats to its normal temperature, the thermally degradable material can decompose and leave void spaces between the islands of proppants. The proppant cores (which are left behind after the resin coating of the proppants degrades) can hold the fracture open while the larger void spaces left by the thermally degradable material can provide high permeability to allow fluid to flow through the fracture.

Figure 5:
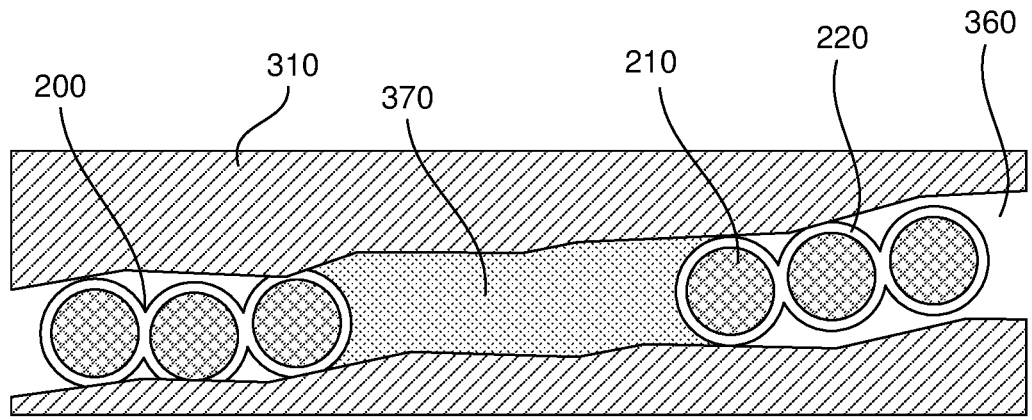
FIG. 5 is a cross-sectional view of an example fracture having proppants and a thermally degradable material therein in accordance with the present disclosure.

In a particular example, an amount of fracturing fluid containing proppants can be injected into a fracture, and then an amount of thermally degradable material can be injected into the fracture, and the injection of these materials can be alternated multiple times. This can result in discrete pockets or islands of proppants separated by the thermally degradable material. The resin coatings of the proppants can also stick together, which further encourages the proppants to aggregate and form islands. FIG. 5 shows an example fracture 360 that has been injected with proppants 200 alternated with a thermally degradable material 370. The proppants have agglomerated to form islands of proppant particles separated by the thermally degradable material. After the geothermal formation reaches its normal temperature, the thermally degradable material will decompose and leave behind void spaces between the islands of proppants.

When thermally degradable material is injected with the proppants, either in a mixture or in an alternated fashion, the relative amounts of thermally degradable material and proppants can vary. In some examples, the ratio of the volume of proppants injected into the fracture compared to the volume of thermally degradable material injected into the fracture can be from about 30:70 to about 70:30. Thus, the volume in the fracture that is occupied by proppants compared to the volume that is occupied by thermally degradable material can have the same ratio of 30:70 to 70:30. In further examples, the ratio can be from 40:60 to 60:40, or from 40:60 to 50:50, or from 35:65 to 45:55.

The thermally degradable material can include a variety of materials that decompose at a temperature below the geothermal formation temperature. In some examples, the thermally degradable material can be a low-density viscous polymer gel such as polyvinyl alcohol and polyacrylamide, an anionic polymer of polyacrylamide, or a cross linked copolymer of either of these materials, or another viscous non-cellulosic polymer. In other examples, the thermally degradable material can be a low-density cement including a thermally degradable cement. In further examples, the thermally degradable material can have an increased gel strength or is made to have low density by foaming. Foaming agents may be used with nitrogen added as bubbles to cement or to a polymer, or a thermally degradable foamed polymer pellet such as foamed polylactic acid beads may be used.

In yet another example, the thermally degradable material can be a particulate material such as glasses, polyglycolic acid, polylactic acid, polyhydroxybutyrate, co-hydroxyvalerate, polybutylene succinate, polypropylene fumarate, polycaprolactone, polyethylene terephthalate, polyhydroxyalkanoate, polycarbonate, polyoxybenzylmethylenglycolanhydride, polyethylene, polypropylene, polyester, polyaramid, polybutylene succinate, polyether ether ketone, or combinations thereof. In certain examples, the thermally degradable material can include a polyaramid such as poly (isophthaloyl chloride/m-phenylenediamine) or poly-paraphenylene terephthalamide. Non-limiting examples of glasses can include borosilicate glass, soda lime glass, flint glass, fiberglass, and combinations thereof.

In other examples, the thermally degradable material can be a thermally degrading foamed cement such as a calcium aluminum cement, ammonium magnesium phosphate sorel cement, magnesium phosphate sorel cement, or magnesium potassium phosphate sorel cement.

In further examples, the thermally degradable material can be an inorganic material such as boehmite, alumina, an acid-base cement, sorel cement, magnesium sulfate sorel cement, magnesium chloride sorel cement, calcium aluminum cement, calcium carbonate, ammonium magnesium phosphate sorel cement, magnesium phosphate sorel cement or magnesium potassium phosphate sorel cement, aluminum hydroxide, magnesium oxide, amorphouse silicon dioxide, crystalline silicon dioxide, and other water soluble inorganic material. Non-limiting examples of suitable acid-base cements can include magnesium oxy-acid cement, magnesium ammonium phosphate cement, magnesium potassium phosphate cement, magnesium oxyphosphate cement, calcium aluminate cement, and combinations thereof. Acid-base cements are materials that result from the reaction of a base in powder form with a liquid acid to produce a cementitious matrix and water. These cements are allowed to hydrate or set up to a hard material and then are ground into a target particle size distribution for effective use. Typical bases used for cement formation are oxides or carbonates of divalent and trivalent metals (e.g. calcium, cobalt, copper, and zinc), aluminosilicate glasses, and gelatinizing minerals. The latter minerals are those that contain small silicate groups such as orthosilicates, pyrosilicates, and silicates containing isolated six-membered silicate rings. Also included are minerals with large continuous silicon-oxygen networks that disintegrate into smaller silicate units including disilicates containing appreciable ferric iron in the silicon-oxygen sheets or three-dimensional network silica minerals that contain aluminum in the ratio of at least two aluminum atoms to three silicon atoms. The acid portion of the cement is typically an aqueous solution of inorganic or organic acids including phosphoric acid, multifunctional carboxylic acids, phenolic compounds, polymers bearing carboxylate or phosphate side-groups, and aqueous metal salts (typically chlorides, phosphates, and sulfates).

A wide range of acid-base cement particles can be produced due to the large variety of acid and base sources that may be utilized. Thus it is possible to adjust the properties of the particles for different rates and temperatures at which dissolution takes place.

As an example, magnesium oxide may be used as a base source, and aqueous magnesium chloride may be used as an acid source to produce an acid-base cement having the chemical formula of $5[Mg(OH)_2](MgCl_2) \cdot 8H_2O$ (different cements can be produced by varying the ratio of MgO and $MgCl_2$). As still another example, magnesium oxide may be used as the base component and aqueous magnesium sulfate may be chosen as an acid source, to produce magnesium oxysulfate acid-base cements such as the 3-form with the composition $3[Mg(OH)_2]MgSO_4 \cdot 8H_2O$. Similarly, magnesium oxide may be reacted with aqueous dihydrogen phosphate salts to produce an acid-base cement having the chemical formula $MMg(PO_4) \cdot 6H_2O$ (where M=alkali metal cation or ammonium). A different magnesium oxyphosphate cement, $MgHPO_4 \cdot 3H_2O$ can be produced from magnesium oxide and aqueous phosphoric acid as the acid source.

Although not required, degradation of the thermally degradable material can be accelerated by adding reactive compounds to the geothermal well after the thermally degradable material is in place. For example, when the thermally degradable material is certain types of cement, an acid can be introduced that converts the cement to water-soluble salts. In other examples, a chelating agent can be introduced to cause the dissolution of the cement. However, in other examples, the thermally degradable material can degrade due to high temperature alone without any reactive compounds being added to the geothermal well. The particular choice of thermally degradable material can determine the length of time for degradation as a function of temperature. For example, thermally degradable materials can be chosen to thermally degrade over a period of hours to several days at a particular formation temperature.

More specifically, degradation kinetics can be tailored to match fracturing times and conditions. For example, choice of specific materials and particle sizes can affect degradation kinetics. Accordingly, in some examples the thermally degradable material can remain stable during the process of injecting the thermally degradable material and the proppants into the geothermal formation, and then the thermally degradable material can degrade at a desired rate after the injection is finished.

The thermally degradable materials used in the methods described herein can be selected to be benign and to have benign breakdown products. Polymeric particles tend to degrade via hydrolysis, typically into non-persistent compounds, which circulate out of fractures. Inorganic particles, on the other hand, most often degrade via dissolution with time and as their temperature increases. Particulate size distributions can be chosen depending on the type of formation, expected fracture width, and desired distribution within a fracture to achieve desirable degree of hydraulic isolation. Although desired particle sizes can vary depending on the formation and desired degree of isolation, typical sizes can range from about 0.005 mm to about 2 cm. Particles shapes can also be varied to achieve desirable packing and degradation characteristics. For example, particles can be spherical, irregular, fibers, rods, blocks, or other shapes, including combinations of these shapes. Corresponding materials can be ground from larger material or grown and formed having a desired morphology. For example, the particles can be formed as a distribution of particles and/or in other shapes to enhance the sealing ability of the thermally degradable material.

Some specific examples of thermally degradable materials can include calcium carbonate, soda lime glass, borosilicate glass, 50-100 mesh size crushed glass, 30-50 mesh size crushed glass, fiberglass, TZIM diverters (AltaRock Energy, USA), ENMAT™ PHBV resin (TianAn Biologic Materials Co., China), poly(propylene fumarate), polybutylene succinate, CAPA® 6500 (Ingevity, USA), boehmite, aluminum hydroxide, alumina, calcium aluminate cement, Bakelite, thermoset Bakelite, polycarbonate, polybisphenol carbonate, KEVLAR® (DuPont, USA), NOMEX® (DuPont, USA), polyethylene terephthalate, and polycaprolactone.

Figure 6:
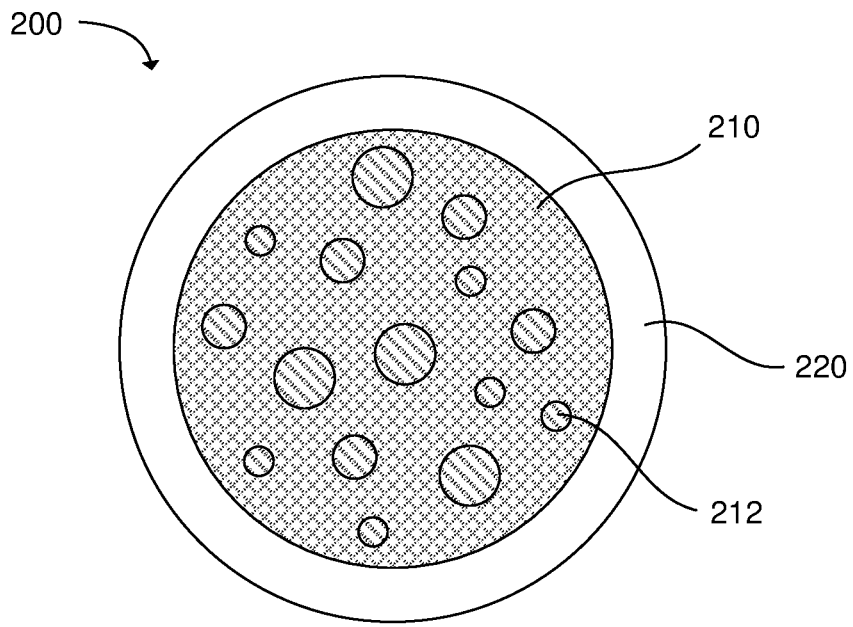
FIG. 6 is a cross-sectional view of another example high-temperature proppant in accordance with the present disclosure.
Figure 7:
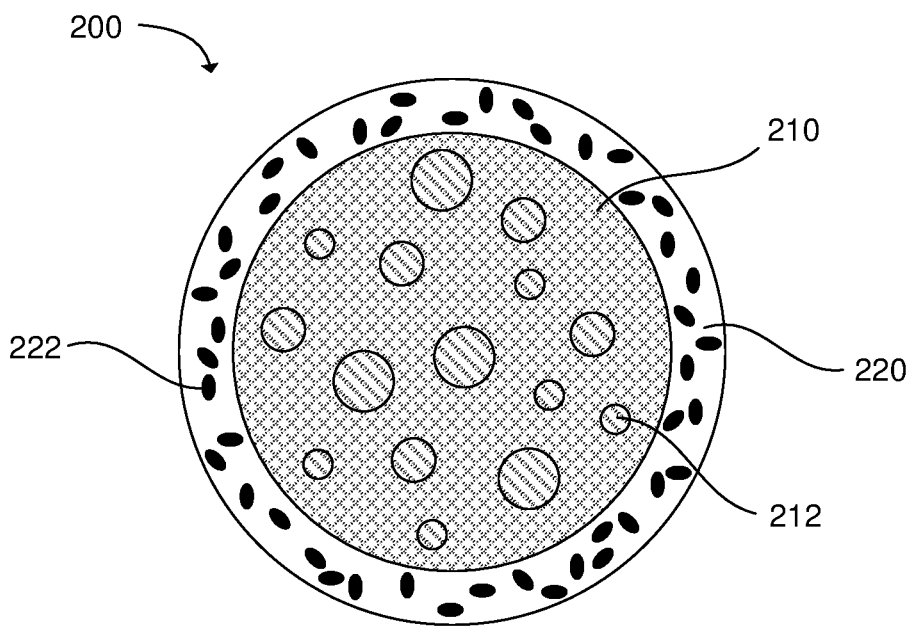
FIG. 7 is a cross-sectional view of yet another example high-temperature proppant in accordance with the present disclosure.

FIGS. 6 and 7 show additional specific types of high-temperature proppants that can be used in the methods described above. FIG. 6 shows a proppant 200 that includes a proppant core 210 including porous calcined petroleum coke with a mineral solubility modifying agent 212 held within pores of the porous calcined petroleum coke. The mineral solubility modifying agent either promotes precipitation of minerals in a fracture or promotes dissolution of minerals in a fracture. The proppant also includes a resin coating 220 coated on the core. The resin coating includes a polymer that has a decomposition temperature from about 250° C. to about 400° C. and a melting temperature below the decomposition temperature. This proppant can be particularly useful in geothermal formations that have a formation temperature above the decomposition temperature of the polymer in the resin coating. The mineral solubility modifying agent can include any of the example mineral solubility modifying agents described above.

FIG. 7 is a cross-sectional view of another example proppant 200. This proppant includes a resin coating 220 with particulates of perlite 222 embedded in the resin. As mentioned above, in some examples the proppants can include particulates such as perlite or expanded graphite in the resin coating. These particulates can reduce the overall density of the proppants. The example shown in FIG. 7 also includes a proppant core 210 made of porous calcined petroleum coke with a mineral solubility modifying agent 212 held within the pores of the porous calcine petroleum coke. It is noted that the figures are not necessarily drawn to scale and any of the components shown therein may vary in size, including the proppants, cores, pores, resin coatings, perlite, or other particulates, etc. as discussed in more detail previously.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of forming a permeable proppant pack in a geothermal formation, comprising:
   injecting a fracturing fluid into a fracture of a geothermal formation having a formation temperature greater than about 230° C., wherein the fracturing fluid comprises proppants having a core of a solid material that is thermally stable at the formation temperature, wherein the core is at least partially coated with a resin coating, wherein the resin coating comprises a polymer having a decomposition temperature below the formation temperature and a melting temperature below the decomposition temperature; and
   allowing the resin coating to be decomposed by heat from the geothermal formation, wherein the core of the proppants remains in the fracture after the resin coating has decomposed.

2. The method of claim 1, wherein the core comprises petroleum coke, coal coke, ceramic, metal oxides, metal hydroxides, graphite, silica, high temperature glass, or a combination thereof.

3. The method of claim 1, wherein the core comprises calcined petroleum coke.

4. The method of claim 3, wherein the calcined petroleum coke is porous and a mineral solubility modifying agent is held within pores of the porous calcined petroleum coke, wherein the mineral solubility modifying agent either promotes precipitation of minerals in the fracture or promotes dissolution of minerals in the fracture.

5. The method of claim 4, wherein the mineral solubility modifying agent comprises one or more of anhydrous calcium sulfate, NaOH, HCl, $H_2SO_4$, EDDHA, EDTA, urea and dimethyl carbonate.

6. The method of claim 5, wherein the mineral solubility modifying agent is anhydrous calcium sulfate and wherein the fracturing fluid also includes sodium carbonate, wherein the anhydrous calcium sulfate reacts with the sodium carbonate after the resin coating has decomposed to form calcium carbonate in a fracture of the geothermal formation.

7. The method of claim 1, wherein the polymer is polyethylene terephthalate, polybutylene terephthalate, polycarbonate, epoxy, acrylonitrile butadiene styrene, or a combination thereof.

8. The method of claim 1, wherein the melting temperature is from about 250° C. to about 300° C. and wherein the decomposition temperature is from about 300° C. to about 375° C.

9. The method of claim 1, wherein the resin coating further comprises particulates of perlite, expanded graphite, silica, or a combination thereof embedded in the resin coating.

10. The method of claim 1, wherein the proppants have a density from about 1 $g/cm^3$ to about 2.5 $g/cm^3$.

11. The method of claim 1, wherein the proppants have an average total diameter from about 1 mm to about 15 mm.

12. The method of claim 1, wherein the resin coating has an average thickness from about 0.5 mm to about 3 mm.

13. The method of claim 1, further comprising injecting a thermally degradable material into the fracture.

14. The method of claim 13, wherein the injecting of the fracturing fluid and the injecting of the thermally degradable material are alternated multiple times, wherein the thermally degradable material degrades after being injected, leaving behind islands of the proppants in the fracture.

15. The method of claim 13, wherein a ratio of a volume of proppants injected into the fracture to the volume of thermally degradable material injected into the fracture is from about 30:70 to about 70:30.

16. A high-temperature proppant, comprising:
   a core comprising porous calcined petroleum coke having a mineral solubility modifying agent held within pores of the porous calcined petroleum coke, wherein the mineral solubility modifying agent either promotes precipitation of minerals in a fracture of a high-temperature formation or promotes dissolution of minerals in a fracture in a high-temperature formation; and
   a resin coating at least partially coating the core, wherein the resin coating comprises a polymer having a decomposition temperature from about 250° C. to about 400° C. and a melting temperature below the decomposition temperature.

17. The high temperature proppant of claim 16, wherein the mineral solubility modifying agent comprises one or more of anhydrous calcium sulfate, NaOH, HCl, $H_2SO_4$, EDDHA, EDTA, urea, and dimethyl carbonate.

18. The high temperature proppant of claim 17, wherein the mineral solubility modifying agent is anhydrous calcium sulfate and wherein the proppant is in a fracturing fluid that includes sodium carbonate, wherein the anhydrous calcium sulfate reacts with the sodium carbonate after the resin coating has decomposed to form calcium carbonate in the fracture.

19. The high temperature proppant of claim 16, wherein the polymer is polyethylene terephthalate, polybutylene terephthalate, polycarbonate, epoxy, acrylonitrile butadiene styrene, or a combination thereof.

20. The high temperature proppant of claim 16, wherein the melting temperature is from about 250° C. to about 300° C. and wherein the decomposition temperature is from about 300° C. to about 375° C.

21. The high temperature proppant of claim 16, wherein the resin coating further comprises particulates of perlite, expanded graphite, silica, or a combination thereof embedded in the resin coating.

22. The high temperature proppant of claim 16, wherein the proppants have a density from about 1 g/cm3 to about 2.5 g/cm3.

23. The high temperature proppant of claim 16, wherein the proppant has a total diameter from about 1 mm to about 15 mm.

24. The high temperature proppant of claim 16, wherein the resin coating has an average thickness from about 0.5 mm to about 3 mm.

* * * * *